(12) United States Patent
Weigel (10) Patent No.: US 10,250,167 B2
(45) Date of Patent: Apr. 2, 2019

(54) DEVICE AND METHOD FOR STARTING A MOTOR FOR ALTERNATING CURRENT

(71) Applicant: Roland Weigel, Neu St. Johann (CH)

(72) Inventor: Roland Weigel, Neu St. Johann (CH)

(73) Assignee: Weigel AG, Wattwill (CH)

( * ) Notice: Subject to any disclaimer, the term of this patent is extended or adjusted under 35 U.S.C. 154(b) by 0 days.

(21) Appl. No.: 15/151,563

(22) Filed: May 11, 2016

(65) Prior Publication Data

US 2016/0336882 A1   Nov. 17, 2016

(30) Foreign Application Priority Data

May 12, 2015   (EP) ..................................... 15001423

(51) Int. Cl.
| | |
|---|---|
| *H02P 1/16* | (2006.01) |
| *H02P 1/04* | (2006.01) |
| *H02P 1/28* | (2006.01) |
| *H02P 1/42* | (2006.01) |
| *H02P 1/58* | (2006.01) |
| *H02P 1/26* | (2006.01) |

(52) U.S. Cl.
CPC .................. *H02P 1/04* (2013.01); *H02P 1/26* (2013.01); *H02P 1/28* (2013.01); *H02P 1/42* (2013.01); *H02P 1/58* (2013.01)

(58) Field of Classification Search
CPC ...... H02P 1/26; H02P 1/28; H02P 1/42; H02P 1/30; H02P 27/06
USPC .......................................................... 318/778
See application file for complete search history.

(56) References Cited

U.S. PATENT DOCUMENTS

| | | | | |
|---|---|---|---|---|
| 5,644,463 A | * | 7/1997 | El-Sharkawi | H01H 9/56 361/2 |
| 5,894,396 A | * | 4/1999 | Kim | H05B 6/6417 361/103 |
| 7,276,870 B2 | * | 10/2007 | Weigel | F04B 49/10 318/430 |

(Continued)

FOREIGN PATENT DOCUMENTS

| | | |
|---|---|---|
| DE | 637 009 | 10/1936 |
| DE | 1 215 244 | 4/1966 |
| DE | 24 15 156 A1 | 10/1975 |

(Continued)

OTHER PUBLICATIONS

European Search Report Corresponding to 15001423.1 dated Nov. 3, 2015.

*Primary Examiner* — Kawing Chan
*Assistant Examiner* — Bradley Brown
(74) *Attorney, Agent, or Firm* — Davis & Bujold PLLC; Michael J. Bujold (57) ABSTRACT

A device (1) for starting a motor (4) for alternating current, in particular for a compressor (5), wherein the motor (4) has at least one feed line (3) for the electrical power supply. The device comprises an actuator element (10) for limiting the current in the feed line (3), a switching element (16) for bypassing the actuator element (10), a current-monitoring element (15) for monitoring the current in the feed line (3), and a controller (18) for controlling the switching element (16). The actuator element (10) comprises at least a first start-up element (11) and a second start-up element (12) as well as a switch-over element (14) for switching over between the at least first and second start-up elements (11, 12).

21 Claims, 4 Drawing Sheets

(56) References Cited

U.S. PATENT DOCUMENTS

2012/0187886 A1* 7/2012 Mack .................... H02P 27/06
                                                          318/503
2013/0342147 A1* 12/2013 Bidlingmeyer ....... F04B 49/065
                                                          318/430

FOREIGN PATENT DOCUMENTS

DE    10 2006 024 099 A1   11/2007
EP            0 395 589 A1   10/1990
EP            1 538 337 A1    6/2005

* cited by examiner

DEVICE AND METHOD FOR STARTING A MOTOR FOR ALTERNATING CURRENT

The present invention relates to a device and to a method for starting a motor for alternating current as claimed in the preambles of the independent claims.

Motors for alternating current are used in a versatile fashion in industry for driving machines and devices as well as in various domestic appliances. These motors are usually fed by the publically accessible power grid, with both single-phase supply and also three-phase supply being possible. It is known that starting such motors requires a high current value which can be identified, for example in the case of unstable supply grids, through flickering incandescent lamps or through fault during the operation of computers. The start-up current of an electric motor is usually 6 to 8 times the rated current.

In the course of the energy revolution, it is intended that the power supply will be able to be provided locally to a greater extent by means of relatively small power generators such as, for example, wind turbines or photovoltaic systems. In many places, efforts are under way to carry out to an appreciable degree disconnection of existing large scale plants such as, for example, nuclear power plants, from the grid and to deactivate them. However, eliminating such constant energy suppliers make its necessary to pay a greater attention to the gentle switching on of relatively large electric motors.

In the course of the energy revolution, increasing use is likewise being made of heat pumps for providing heating, in particular in private households, said heat pumps acquiring the heat, for example, from the ambient air, by means of a heat exchanger and a corresponding compressor, in order to make available warm water for heating and/or service water.

The problem with the high current loading when starting such compressors for heat pumps was already detected early and dealt with in different ways. For example, nowadays what are referred to as soft starters for heat pomp compressors are commercially available, said soft starters operating for the most part by means of leading phase angle control. What are referred to as frequency converters, which are intended to permit soft starting of the compressor motor by adapting the frequency and voltage or which operate the compressor motor at a relatively low rotational speed, are also commercially available.

At the same time, legislators are making efforts to permit in future only electric motors with a high level of efficiency for electric devices. Therefore, for example since 2011 only electric motors of the efficiency class IE2 have been permitted. Starting from January 2015, even only electric motors of this type according to the efficiency class IE3 will still be permitted for motors in the power range from 7.5 kW to 375 kW. The corresponding energy efficiency classes are described in the standard TEC 60034-30. The corresponding EU regulations 640/2009 and 04/2014 define the conditions for the change to the new energy efficiency technology.

As is known, refrigerant compressors and their motors have a start-up current (LRA) which corresponds to six to eight times the rated current. So that the grid reactions do not exceed the permitted values according to the valid standards (EN 61000-3-3, EN 61000-3-2), different technologies are offered, as described above, to limit the start-up current, these being leading phase angle control or frequency converters.

Both technologies operate in a digital fashion and produce, to some extent, a noteworthy potential of harmonics or harmonic components. The consequences are asymmetrical loads on feed lines, compressor motors and switching elements of any type. Such loads are identified, inter alia, as waste heat, which in turn worsens the level of efficiency. Furthermore, these loads can lead to overheating of important components and can increase the failure rate and reduce the operational reliability. The use of filter elements or of feed lines which have high quality screening cannot provide enduring suppression of these faults.

Owing to the fact that the motor standard IE3 with the designation "Premium Efficiency" has applied since January 2015, this improved level of efficiency will inevitably also involve a higher start-up current (LRA) of the order of magnitude of eight to ten times the rated current. However, such relatively high start-up currents are no longer acceptable with the valid standards for the grid reaction. Correspondingly, the IE3 motors cannot be reasonably operated either with frequency converters or with leading phase angle control. Legislators have recognized this and correspondingly approved an exceptional regulation for motors for compressors. Therefore, in future an IE2 motors according to the new standard will continue to be permissible if said motor is operated with a frequency converter.

However, this exception does not take into account the fact that the disruptive harmonics/harmonic components cannot be eliminated by means of this control but are merely limited to a smaller value owing to the relatively poor level of efficiency of the motors. Furthermore, with a frequency converter, continuous operation of the compressor motor is proposed since the rotational speed of the compressor motor cannot be easily adapted. However, the compressor motor is therefore no longer operated at its optimum working point, which to a large extent reverses the increase in efficiency from an IE1 to an IE2 motor again.

The object of the invention is therefore to overcome the disadvantages of the prior art. In particular, a device and a method are to be made available for permitting motors for alternating current to be started in a gentle way and, in particular, also for allowing motors of the energy efficiency class IE3 to be started and operated reasonably, in particular in compressors.

These objects are achieved by means of the features specified in the independent patent claims.

The invention relates to a device for starting a motor for alternating current, in particular for a compressor, wherein the meter has at least one feed line for the electrical power supply. The device comprises an actuator element for limiting the current in the feed line, a switching element for bypassing the actuator element, a current-monitoring element for monitoring the current in the feed line and a controller for controlling the switching element. The invention is distinguished by the fact that the actuator element comprises at least a first start-up element and a second start-up element as well as a switch-over element for switching over between the at least first and second start-up elements, each start-up element ensuring a continuous current rise.

A continuous current rise is to be understood here and below as meaning that the current rise in the motor proceeds continuously apart from the alternating-voltage-induced sine wave, and does not have any high-frequency interference peaks. Correspondingly mechanical strain in comparison to the prior art is reduced, since disruptive harmonics/harmonic components and abrupt voltage peaks creating sudden burst reactions in the motor are prevented. Accordingly there are less thermal losses. Both factors increase the life expectancy of both the electronical and mechanical components.

As a result of the use of such start-up elements in the actuator element, soft starting of the motor is ensured. For example NTC thermistor elements can be used as start-up elements. NTC thermistor elements represent a high resistance in the cold state, with the result that correspondingly only a small current can flow in the feed line when switching on occurs. In the course of time, the NTC thermistor element heats up and its impedance correspondingly becomes low. The current in the feed line increases continuously. The great advantage of the device according to the invention compared to the known solutions with leading phase angle control or frequency converters lies in this continuous increase in the current. Whereas with the soft starter which is used according to the prior art, the sine wave is chopped up or cut into as a result of the use of the digital technology, and the resulting high degree of steepness of the signal edges generates the corresponding interference harmonic components in the grid, the continuous rising of the current in the feed line and in the actuator element prevents any harmonic components from occurring. Only the start-up current which is required for the starting and the operation can at most give rise to disruption in unstable networks.

As a result of the use of a plurality of NTC thermistor elements and of a corresponding switch-over element in the feed line, any NTC thermistor element can be operated, for example, only for as long as a predefined current flows. As a result of the switching over, the NTC thermistor element which has already heated up is removed from the feed line and correspondingly replaced by a fresh NTC thermistor element. In accordance with the relatively cold temperature of this second NTC thermistor element, the current is in turn reduced and subsequently rises continuously. This process can then be theoretically repeated as often as desired, with the result that the motor can be started with a very low start-up current. For example, start-up currents of the order of magnitude of one and a half to three times the rated current are conceivable. Even the motors of the efficiency class IE3 which cannot be started reasonably with conventional starters can therefore be used and correspondingly started in compressors without problems and without infringing the applicable standards EN 61000-3-3 and EN 61000-3-2. Therefore, both energy savings and cost savings can be implemented. Furthermore, the NTC thermistors are loaded to a lesser extent, since the maximum current is reduced.

A single NTC thermistor or a plurality of NTC thermistors connected in series can be used as the NTC thermistor element. Correspondingly, a device for starting different motors can be constructed with a small number of different components. It goes without saying that in the case of three-phase systems the actuator element is arranged in any feed line or in any phase. Correspondingly, the current is also preferably monitored in all three phases.

In a first embodiment, the invention relates to a device with start-up elements in the form of NTC thermistors as described above. Likewise, the invention relates to a device with start-up elements with the explicit exclusion of NTC thermistors as a current-limiting element, as described below.

Power transistors can also be used as start-up elements instead of the NTC thermistors, said power transistors being controlled by a corresponding ramp generator. In this context, the ramp generator makes available a constantly or continuously rising ramp for controlling the power transistor. For example, such a ramp generator can be implemented by means of an RC element. However, it is also conceivable that an NTC thermistor element or a PTC thermistor element is in turn used to generate the ramp. Of course, it is also conceivable that the ramp is read out from a memory and controls the power transistor given corresponding resolution and/or smoothing. One power transistor is then switched over respectively to the next power transistor, with the result that the individual power transistor is loaded only briefly. Furthermore, a circuit can be provided which does not switch over the combination of power transistors but rather switches over only the corresponding ramp generators. Instead of individual ramp generators which can be switched over, it is also possible to use a single curve generator which permits integrated switching over between at least two continuously rising ramps. In both cases, the power transistor is loaded during the entire running up of the motor. Preferably MOSFETs (metal-oxide semiconductor field-effect transistors) are used as the power transistors. A circuit with IGBT (bipolar transistor with insulated gate electrode) is also conceivable. However, different switching expenditure is required for IGBTs. The principle of the switched-over running up of the motor is approximately identical in all the embodiments of the start-up elements. Correspondingly, the advantages can be transferred from the one configuration to the other configuration.

The switch-over element can be controllable by the controller. This permits, for example, the switch-over element to switch over in predetermined time periods. However, it is also alternatively conceivable for the switch-over element to be controlled by the controller as a function of the monitored current in the feed line.

The controller can be configured in such a way that when a preset or presettable first current value is reached in the feed line, said controller activates the switch-over element. Such a controller can ensure, for example, that the current which is required for the starting of the motor does not exceed a specific value. For example, conditional temperature control of the start-up elements or of the NTC thermistor elements and/or of the power transistors used therein is therefore also possible. At the same time, the start-up elements are protected in that they are loaded only up to a permissible current value. This gives rise to a longer service life of the device, which is desirable, in particular when it is used in a heat pump.

The device can have a voltage-monitoring element for monitoring the voltage across the actuator element. Voltage monitoring permits, for example, the recording of interference voltages and of the behavior of the start-up elements.

The switching element can be controllable by the controller, in particular as a function of the voltage across the actuator element. Correspondingly, for example in the case of an unacceptable voltage or when the rated rotational speed is reached, the actuator element can be bypassed.

The controller can be configured in such a way that when a preset or presettable voltage value across the actuator element is reached, said controller activates the switching element. When the motor starts, the voltage across the actuator element is usually relatively high, since the corresponding start-up element still limits the current and the NTC thermistor element being used is still cold and/or the power transistor is not yet entirely conducting and therefore has a high impedance. However, in the course of time this voltage value will approach a minimum, such a minimum voltage value meaning the motor is being operated approximately at the rated rotational speed. Correspondingly, such a voltage value can be preset, with the result that when this minimum voltage value is reached, the actuator element can be bypassed. Correspondingly, no power loss is generated anymore in the actuator element and the NTC thermistor elements and/or power transistors of the actuator element which are used in the start-up elements can cool down for the next starting process.

The device can have a zero crossing detector. The controller can at the same time be configured in such a way that said controller controls the switching element and/or the switch-over element at the zero crossing. As a result of the fact that circuits are respectively implemented at the zero crossing, a further contribution can be made to reducing harmonic components and transients. No abrupt switching edges are produced, which create sudden burst reactions in the motor. Accordingly there are less thermal losses. Both factors increase the life expectancy of both the electronical and mechanical components.

The device can have a circuit breaker, in particular in the form of a zero crossing switch. This circuit breaker serves to switch the device on and off. The controller can at the same time be configured in such a way that when a predefined or predefinable second current value in the feed line is exceeded, said controller automatically switches off the circuit breaker. Such a device makes it possible that, for example when a fault is present or when the motor is blocked, the device cannot be overloaded.

In this context, the second current value can be set in such a way that its maximum lies in the region of three times, preferably two times, most preferably one and a half times the rated current of the motor. The control or the monitoring of the current in the feed line is appropriately so precise that brief overloading of the predefined current value already causes switching off to occur. It can therefore be ensured that the circuit breaker switches off before the automatic circuit breaker system which is usually used in households or industry applications is triggered.

The controller can also comprise a timer with a preset or presettable waiting time. In addition, the controller can be configured in such a way that after automatic switching off of the circuit breaker has taken place and the waiting time has expired, the controller switches on the circuit breaker again. Correspondingly it is ensured that the motor can be started once more after an unsuccessful starting attempt and after expiry of the waiting time. The waiting time is dimensioned here in such a way that the actuator element and the motor can correspondingly cool down again, with the result that in turn a soft start is ensured.

The controller can also be embodied in such a way that, for example, automatic switching off and switching on again three consecutive times gives rise to an alarm situation. For example, in such a situation the controller can output a fault message to a superordinate system.

The feed line can have a varistor in order to protect the device against overvoltage from the grid. In particular when the device is used in a public grid, it is advantageous if the device is correspondingly protected against faults, caused by other grid users.

A further aspect of the present invention is directed to a method for starting a motor for alternating current. In this context, an actuator element which can be bypassed by a switching element is arranged in a feed line to the motor, the actuator element having a switch-over element and at least a first start-up element and a second start-up element, the start-up elements ensuring a continuous current rise. The method comprises the steps:
  connecting the actuator element with the first start-up element into the feed line,
  switching over from the first start-up element to the second start-up element.

The use of such start-up elements in the actuator element has the effect that a continuously rising current is fed to the motor. Correspondingly, the current will have a soft start and will not bring about any high level of current consumption in an uncontrolled fashion. For example, start-up elements in the form of NTC thermistors can be used. As a result of the switching over from a first NTC thermistor element to a second NTC thermistor element it is possible to ensure, for example, that the current which is fed to the motor remains within specific limits. Therefore, for example the first NTC thermistor element is operated until it reaches a specific temperature. Subsequently the first NTC thermistor element is removed from the feed line, and the second NTC thermistor element is connected to it. It goes without saying again that an NTC thermistor element can be a single NTC thermistor or a plurality of NTC thermistors connected in series. It also goes without saying that in a three-phase system a corresponding actuator element can be arranged, and is preferably arranged, in any phase.

As already mentioned above, one or more power transistors can also be used as start-up elements instead of the NTC thermistors, said power transistors being controlled by a corresponding ramp generator or a curve generator. Here, the ramp generator provides a continuously rising ramp for controlling the power transistor, which ramp is switched over to the next ramp by the switch-over element. In the case of a curve generator, the switching over is integrated. The configuration and functionality are described above.

The current in the feed line can be monitored, and the switching over between the start-up elements can correspondingly take place as a function of the current in the feed line. The switching over can take place here when a first preset or presettable current is reached in the feed line. Correspondingly, it can be ensured that the motor is started at maximum with the preset or presettable current. Higher current loads are correspondingly ruled out.

The voltage across the actuator element can be monitored and when a preset or presettable voltage is reached, the actuator element can be bypassed. Such bypassing takes place, for example, when the voltage across the actuator element has decreased to such an extent that it is close to a minimum value. Correspondingly it can be assumed that the motor is being operated virtually at the rated rotational speed. The bypassing of the actuator element prevents additional energy in the actuator element from being converted into heat. The NTC thermistor elements and/or power transistors which acre used in the actuator element can cool down, with the result that they can be used again in a cold state for the next starting process.

The zero crossing of the voltage in the feed line can be detected, with the result that the switching over and/or bypassing can take place at the zero crossing. The switching over and/or bypassing at the zero crossing can ensure that no unnecessary switching edges or voltage peaks, which can in turn propagate as disruptive harmonic elements in the grid, are generated.

The motor is usually provided for driving a load. Before the starting of the motor, the load can be disconnected from the motor or at least reduced. When the motor is used in a compressor, for example a bypass valve in the compressor is opened, with the result that the pressure difference across the compressor is reduced or equalized. Simple starting can take place by virtue of the fact that the motor is disconnected from the load or the load is reduced. This bypass can also be opened in case of an overload on the grid. Accordingly the compressor and also the grid will be relieved momentarily. This is an advantage particularly in instable grids.

When a predefined or predefinable second current value in the feed line is exceeded, a circuit breaker can be automatically switched off. Such a circuit breaker is installed, for example in the form of a zero crossing switch, in the feed line to the motor. Correspondingly, overloading of the actuator element or of the motor can be prevented if the latter, for example, blocks or else some other fault is present.

After automatic switching off of the circuit breaker has taken place and after a preset or presettable waiting time has expired, the circuit breaker can be switched on again. Therefore, for example automatic switching on again after an unsuccessful switching on attempt is possible.

Furthermore, for example after unsuccessful switching on again has occurred multiply in succession, a fault message can be generated which is further processed by a connected system.

The invention will be explained in more detail below with reference to illustrations of exemplary embodiments. In the illustrations.

Figure 1:
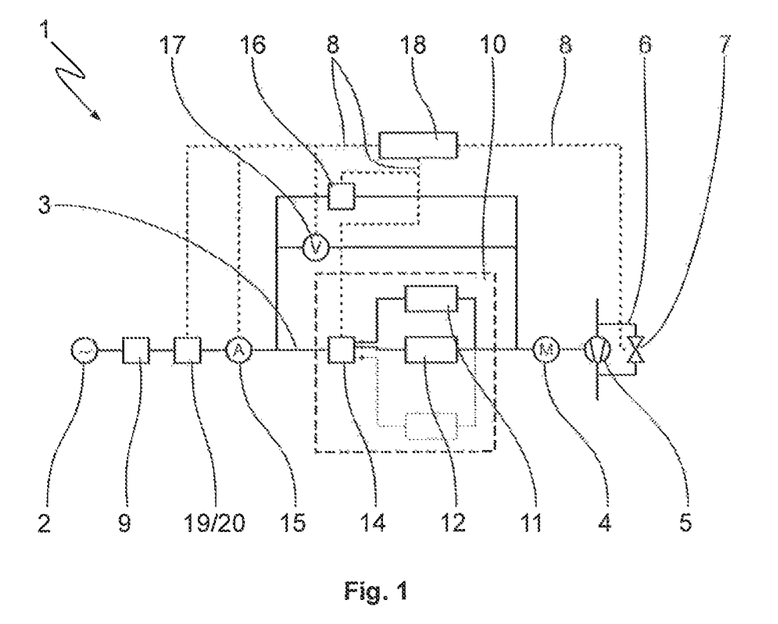
FIG. 1: shows an equivalent circuit diagram of a device according to the invention.

FIG. 1 illustrates an equivalent circuit diagram of a device 1 according to the invention for starting a motor 4 for alternating current. The motor 4, which drives a compressor 5, is supplied with energy from a grid input 2 by means of a feed line 3. In order to limit the high start-up currents which are involved in the starting, an actuator element 10 is installed in the feed line 3. In contrast to the generally customary prior art, the actuator element is now not operated in a digital fashion, and the energy is therefore not limited by means of leading phase angle control, neither is the frequency adapted with a frequency converter. The actuator element 10 has at least two start-up elements in the form of two NTC thermistor elements 11, 12 which can be operated in series by means of a switch-over element 14 in the feed line 3. Likewise, the device 1 has a switching element 16 which can bypass the actuator element 10. When the device switches on or when the motor is started, the compressor 5 is preferably disconnected from the motor or at least operated in a pressure-free fashion via a bypass line 6 and a corresponding bypass valve 7. Correspondingly, the load which the motor 4 is ultimately intended to drive is reduced, with the result that less energy has to be applied to start the motor 4. In order to be able to switch the bypass valve 7, the latter is connected to the controller 18 via a signal line 8.

In order reduce the current in the feed line 3 further, at least two NTC thermistor elements 11, 12 are now used in series instead of a single NTC thermistor element. Since the first NTC thermistor element 11 is still cold when the starting process begins, the latter has a high resistance value, and the current in the feed line 3 to the motor 4 is limited. However, the first NTC thermistor element 11 will subsequently heat up and correspondingly reduce its resistance value. The start-up current in the feed line 3 is as a result continuously increased. Before the first NTC thermistor element 11 is now operated in the thermal equilibrium, the first NTC thermistor element 11 is now removed from the feed line 3 with the switch-over element 14, and instead the second NTC thermistor element 12 is connected thereto. This second NTC thermistor element 12 is still cold and correspondingly in turn has a high resistance value. Therefore, by switching over from the first to the second NTC thermistor element the resistance value of the actuator element 10 is increased and as a result the start-up current in the feed line 3 to the motor 4 is reduced. Over time, the second NTC thermistor element 12 heats up, the resistance value drops and the start-up current in the feed line 3 rises.

As a result of the use of a plurality of NTC thermistor elements which are connected into the feed line in series, the start-up current can theoretically be kept as any desired low value. This therefore makes is possible, for example, for a compressor motor with a rated current of 12 A to be started and operated at a domestic 10 A or even at a 6 A fuse with a type C tripping characteristic according to VDE 0641 part 11, DIN EN 60898-1:2005-04.

The switch-over element 14 is controlled by a controller 18 via a signal line 8, which in turn triggers the switching over on the basis of the current flowing in the feed line 3. For this purpose, a current-monitoring element 15, which is also connected to the controller 18 via a signal line 8, is arranged in the feed line 3. The controller 18 can then trigger the switching over when a preset current value is reached, for example when 20 A, preferably 15 A, most preferably 12 A is reached. If the switching over takes place within a short time, a domestic 10 A or 6 A fuse with a type C tripping characteristic according to VDE 0641 part 11, DIN EN 60898-1:2005-04 is not tripped and the motor can continue to be started.

The device 1 also has a voltage-monitoring element 17 which monitors the voltage across the actuator element 10 and signals it further to the controller 18 by means of a signal line 8. As soon as this voltage undershoots a preset or presettable value, the switching element 16 is closed via the controller 18 and a further signal line 8, with the result that the actuator element 10 is bypassed. The preset value is defined here in such a way that it is undershot briefly before the rated rotational speed of the motor 4 is reached. Correspondingly, just before the rated rotational speed is reached the motor 4 is no longer supplied with energy via the actuator element but is instead connected directly to the grid supply 2.

In order to avoid undesired voltage peaks or current peaks when switching over between the NTC thermistor elements 11, 12 or when bypassing the actuator element 10, the device has a zero crossing detector 19 which is connected to the controller. Correspondingly it is made possible for the switching processes to take place in each case precisely at the time of the zero crossing, that is to say in the voltage-free state. Alternatively, the switch-over element 14 and the switching element 16 can also be embodied directly as zero crossing switches.

In order to avoid overloading the motor 4 or the actuator element 10 in the event of faults, a fault current can also be detected by means of the current-monitoring element 15. If the current in the feed line 3 reaches, for example, a value of 25 A, preferably 20 A, most preferably 15 A, a further switching element, for example in the form of a zero crossing switch 20, is opened, with the result that the entire device 1 is disconnected from the grid supply 2. It goes without saying that in this context the controller 18 can continue to operate. The controller 18 is provided, inter alia, with a timer which closes the zero crossing switch 20 again after a preset waiting time, for example 15 min. The device then attempts again to start the motor 4. The controller will completely abort the start-up attempts and output a corresponding fault message only in the case of a repeated consecutive unsuccessful start or in the case of repeated switching off of the zero crossing switch 20.

The circuit according to FIG. 1 shows merely the device according to the invention in a single feed line to the motor, for example for a single-phase motor. It goes without saying that when a three-phase motor is used, the corresponding device is arranged in any of the three phases. However, in this context individual elements such as, for example, the controller can be embodied in a centralized fashion, while other elements, for example the actuator element, are preferably present in every phase.

Figure 2:
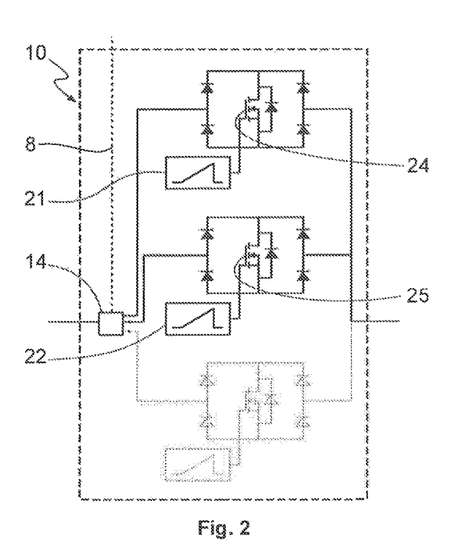
FIG. 2: shows an equivalent circuit diagram of an actuator element with connected power transistors and ramp generators as start-up elements.

FIG. 2 illustrates an equivalent circuit diagram of an actuator element 10 with connected MOSFET power transistors 24, 25 and ramp generators 21, 22 as start-up elements. The diodes shown in the equivalent circuit serve merely to correctly connect the power transistor and are not described further. The actuator element 10 performs the same function here as the actuator element from FIG. 1. Correspondingly, the actuator element 10 is connected between the grid supply and the motor. The actuator element 10 has at least two start-up elements in the form of two power transistors 24, 25 and associated ramp generators. As a result of the switch-over element 14, it is possible to switch over between the start-up elements. When the device is switched on or when the motor is started, the actuator element 10 will switch the first power transistor 24 into the feed line with the switch-over element 14. The ramp generator 21 will generate, in accordance with its configuration, a slowly rising ramp and therefore control the power transistor 24. The power transistor 24 will slowly become conductive, and the current through the power transistor 25 will increase in accordance with the control ramp of the ramp generator 21. As soon as a preset power maximum is reached, the change-over switch 14 is controlled by the controller 18 (see FIG. 1) via the signal line 8, with the result that switching over to the second power transistor 25 and its ramp generator 22 takes place. This ramp generator 22 in turn generates a ramp for controlling the power transistor 25, with the result that the current in the feed line to the motor 4 rises continuously again (see FIG. 1).

As already mentioned above, the ramp generators 21, 22 can each be constructed from an RC element. However, a rising ramp for controlling the power transistors 24, 25 can also be implemented by means of an NTC thermistor or a PTC thermistor. A further possibility is to read out a ramp from a memory with corresponding resolution and/or subsequent smoothing.

By virtue of the use of a plurality of power transistors with ramp generators which are connected into the feed line in series, the start-up current can theoretically be kept at a value smaller than 20 A, preferably smaller than 15 A, most preferably smaller than 12 A, cf. in this respect the description relating to FIG. 1.

Figure 3:
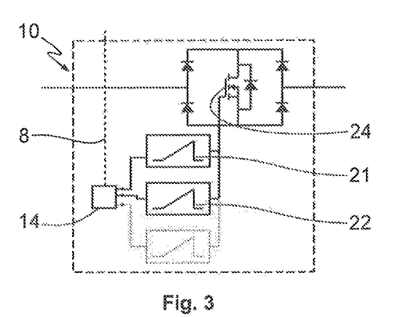
FIG. 3: shows an equivalent circuit diagram of an actuator element with connected ramp generators and a single power transistor.

FIG. 3 shows an equivalent circuit diagram of an actuator element 10 with connected ramp generators 21, 22 and a single MOSFET power transistor 24. In this circuit, switching over no longer occurs between the power transistors, and the same power transistor 24 is used for the entire starting process. Switching over is carried out only between the different ramp generators 21, 22 which control the power transistor 24 in series. The illustrated diodes serve to connect the power transistor 24 and are not described further. The switch-over element 14 is in turn connected to the controller 18 (see FIG. 1) via the signal line 8, and when a preset maximum current value is reached said switch-over element 14 is controlled to switch over from the first to the second, ramp generator 21, 22. The power transistor 24 will regulate the current flow in the feed line to the motor 4 in accordance with the ramp which is applied (see FIG. 1).

Figure 4:
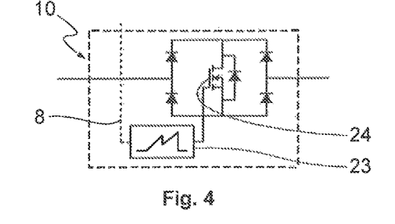
FIG. 4: shows an equivalent circuit diagram of an actuator element with a curve generator with an integrated switching-over means and a single power transistor.

FIG. 4 illustrates an equivalent circuit diagram of an actuator element 10 with a curve generator 23 with integrated switching over means and a single MOSFET power transistor 24. The curve generator 23 is controlled by the controller 18 (see FIG. 1) directly via the signal line 8 and switches over internally. Correspondingly, the change-over switch is integrated into the curve generator 23. In the illustrated example, the curve generator 23 outputs a curve with two subsequent ramps which control the power transistor 24. The power transistor becomes conductive continuously 24, and the current in the feed line to the motor 4 increases (see FIG. 1). When switching over to the second ramp of the curve generator 23 occurs, the power transistor 24 assumes a high impedance for a brief time and the current is reduced before the current can rise again continuously.

Figure 5:
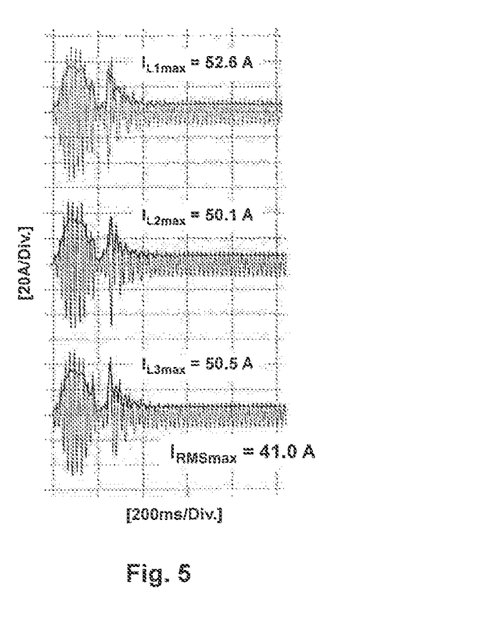
FIG. 5: snows a start-up current of a motor, measured over three phases, of a compressor, which motor starts with a starter, with leading phase angle control according to the prior art.

FIG. 5 shows a start-up current, measured over three phases, of a motor of a compressor, said motor starting with a starter with leading phase angle control according to the prior art. What is mainly striking here is the irregular current profile in all three phases, said profile originating from the uncontrollable harmonics in the grid, which are caused by the leading phase angle control. Owing to irregular windings, the maximum start-up currents which have been measured are not identical in all three phases. However, the maximum currents occur in the region of 50 A, which causes a domestic 10 A fuse to trip. The maximum mean value of the start-up current $I_{RMSmax}$ is 41 A. The motor which is used for the measurement and which has a compressor is a Copeland Scroll 2H45K4E-TFD with a rated current MOC of 11.8 A and a start-up current LRA of 74 A at 3× 400 V and 50 Hz. This compressor with a motor is a commercially available compressor for heat pumps and is frequently used in houses and relatively small apartment blocks.

Figure 6:
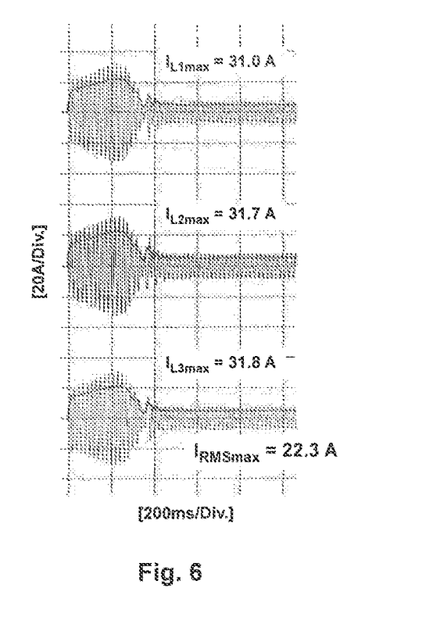
FIG. 6: shows a start-up current of the motor, measured over three phases, from FIG. 2, which motor starts with a starter with an NTC thermistor according to the prior art.

FIG. 6 illustrates a start-up current, measured over three phases, of the same motor from FIG. 5, a starter with an NTC thermistor according to the prior art having been used this time. The regular profile and the uniform rising of the current in the three feed lines or phases are clearly apparent. As a result of the use of NTC thermistors in the feed lines, no fault-relevant harmonic components are generated any more, since an NTC thermistor is a purely ohmic component. The starting characteristic satisfies the standards EN 61000-3-3 and EN 61000-3-2. The motor starts quietly and in a controlled way.

The maximum start-up currents are approximately 31 A, and the maximum mean value of the start-up current $I_{RMSmax}$ is only 22.3 A now. A reduction in the current loading of the order of magnitude of 50% has already been achieved.

Figure 7:
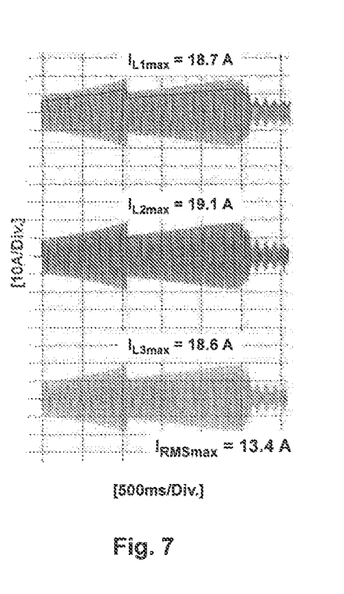
FIG. 7: shows a start-up current of the motor, measured over three phases, from FIG. 2, which motor starts with the device according to the invention as in FIG. 1, FIG. 8: shows a comparison of the reaction of a starter with leading phase angle control with the device according to FIG. 1, wherein a time range of 200 ms after the switching on is illustrated.

FIG. 7 shows in turn a start-up current, measured over three phases, of the same motor which has already been used for the measurements in FIGS. 5 and 6. However, the motor is started with the device according to the invention from FIG. 1. The staring process is significantly lengthened and is approximately 2.5 s as opposed to 0.4 s or 0.3 s in FIGS. 2 and 3. However, on the other hand, the maximum start-up currents are significantly reduced, with the result that they can be supplied with any household fuse of 10 A with a type C tripping characteristic according to VDE 0641 part 11, DIN EN 60898-1:2005-04. The maximum start-up currents are monitored by the device according to the invention. When 20 A, preferably 15 A, most preferably 12 A is reached in a feed line, the switch-over elements 14 (see FIG. 1) are activated, with the result that the subsequent NTC thermistor element controls the current rise. This switching over can be detected clearly after approximately 1 s. In the present example, an actuator element with two NTC thermistor elements is used in each feed line or phase, i.e. switching over can be carried out once in each phase. The maximum mean value of the start-up current $I_{RMSmax}$ is only 13.4 A now.

Figure 8:
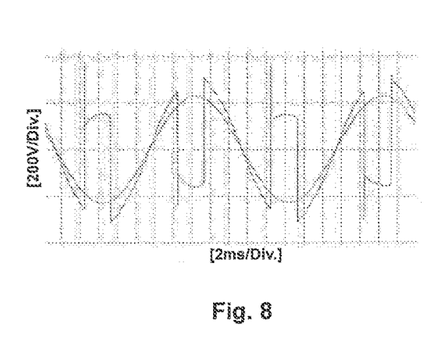

FIG. 8 illustrates in a highly enlarged form a comparison of the reaction of a starter with leading phase angle control with the device according to FIG. 1, a time range 200 ms after the switching on being shown. Two voltage curves can be clearly seen, with the purely sinusoidal curve originating from the device according to the invention as in FIG. 1. The second curve originates from a leading phase angle controller. Correspondingly, a region is cutout in each half wave of the sine curve. However, this cutting out or cutting off brings about extreme gradients in the voltage curves at the moment of the switching. The gradient of the signal edge is $dU/dt=100$ V/μs, here in the case of the leading phase angle control, while in the case of the sine curve according to the device according to the invention the maximum signal edge steepness is merely $dU/dt=0.072$ V/μs, that is to say is lower by a factor of 1389. The fact that the steep signal edges of the voltage curve of the leading phase angle controller undisputedly cause faults in the supply grid and high dynamic impact torques is clear.

The invention claimed is:

1. A device for starting an alternating current motor using an alternating current,
   wherein the alternating current motor has at least one feed line for an alternating current electrical power supply, and said device comprising:
      an actuator element for limiting a current in the feed line to the alternating current motor,
      a switching element for bypassing the actuator element,
      a current-monitoring element for monitoring the current in the feed line to the alternating current 'motor;
      a controller for controlling the switching element,
   the actuator element comprises at least a first start-up element and a second start-up element, which comprises a NTC thermistor, as well as a switch-over element for switching over between the at least first and second start-up elements, and each of the first and the second start-up elements ensuring a continuous current rise in the lead line to the alternating current motor without having any high-frequency interference peaks, and by switching over between the at least first and second start-up elements, the first start-up element is removed from the feed line to the alternating current motor and replaced by the second start-up element, such that the current to the alternating current motor is, in turn, reduced and subsequently rises continuously.

2. The device as claimed in claim 1, wherein the switch-over element is controlled by the controller.

3. The device as claimed in claim 1, wherein the switch-over element is controlled by the controller as a function of the monitored current in the feed line.

4. The device as claimed in claim 1, wherein the controller is configured so that when a preset or presettable first current value is reached in the feed line, said controller activates the switch-over element.

5. The device as claimed in claim 1, wherein the device has a voltage monitoring element for monitoring the voltage across the actuator element.

6. The device as claimed in claim 1, wherein the switching element is controlled by the controller as a function of the voltage across the actuator element.

7. The device as claimed in claim 1, wherein the controller is configured so that when a preset or presettable voltage value across the actuator element is reached, said controller activates the switching element.

8. The device as claimed in claim 1, wherein the device has a zero crossing detector, and the controller is configured so that said controller controls the switching element and/or the switch-over element at the zero crossing.

9. The device as claimed in claim 1, wherein the device has a circuit breaker for switching on the device, and the controller is configured so that when a predefined or pre-definable second current value in the feed line is exceeded, said controller automatically switches off the circuit breaker.

10. The device as claimed in claim 9, wherein the circuit breaker is configured in the form of a zero crossing switch.

11. The device as claimed in claim 9, wherein the controller comprises a timer with a preset or presettable waiting time, and the controller is configured so that after automatic switching off of the circuit breaker occurs and the waiting time expires, the controller switches on the circuit breaker again.

12. A method for starting an alternating current motor using an alternating current, an actuator element being arranged in a feed line to the alternating current motor for limiting a current, a switching element permitting bypassing of the actuator element, and the actuator element having a switch-over element and at least a first start-up element and a second start-up element, which comprises a NTC thermistor, the method comprising the steps:
   connecting the actuator element with the first start-up element into the feed line so that only alternating current electrical power flows to the alternating current motor through the first start-up element, and the first start-up element ensuring a continuous current rise In the feed line to the alternating current motor, and
   switching over, via the switch-over element, from the first start-up element to the second start-up element so that alternating current electrical power only flows to the alternating current motor through the second start-up element, and the second start-up element ensuring a continuous current rise m the feed line to the alternating current motor, the switching over being performed by removing the first start-up element from the feed line and connecting the second start-up element into the feed line to ensure that the current which is fed to the alternating current motor is reduced and subsequently rises continuously and remains within specific limits.

13. The method as claimed in claim 12, further comprising monitoring the current in the feed line, and the switching over between the first and the second start-up elements occurring as a function of the current in the feed line.

14. The method as claimed in claim 12, wherein the switching over takes place when a first preset or presettable current in the feed line is reached.

15. The method as claimed in claim 12, further comprising monitoring the voltage across the actuator element, and when a preset or presettable voltage is reached, bypassing the actuator element.

16. The method as claimed in claim 12, further comprising detecting a zero crossing of the voltage in the feed line, and the switching over and/or bypassing takes place occurring at the zero crossing.

17. The method as claimed in claim 12, wherein the alternating current motor is provided for driving a load, and the load is disconnected from the alternating current motor or reduced before the starting.

18. The method as claimed in claim 12, wherein a circuit breaker is arranged in a feed line to the alternating current motor, and when a predefined or predefinable second current value in the feed line is exceeded, the circuit breaker is automatically switched off.

19. The method as claimed in claim 18, wherein the circuit breaker switches off at a zero crossing.

20. The method as claimed in claim 18, further comprising after automatic switching off of the circuit breaker occurs and after a preset or presettable waiting time expires, again switching on the circuit breaker.

21. A device for starting an alternating current motor using an alternating current, wherein the alternating current motor has at least one feed line for supplying electrical power from an alternating current electrical power supply to the motor, the device comprising:

an actuator element for limiting a current flowing through the feed line from the electrical power supply to the alternating current motor, a switching element for permitting the supplied electrical power to bypass around the actuator element and flow directly to the alternating current motor, a current-monitoring element for monitoring the current flowing in the feed line from the electrical power supply to the alternating current motor, a controller coupled to the current-monitoring element for controlling operation of the switching element, the actuator element comprises at least a first start-up element and a second start-up element, which comprises a NTC thermistor, connected in series with a switch-over element which is coupled to and controlled by the controller, the switch-over element facilitates switching between at least the first and the second start-up elements by removing the first start-up element from the feed line and replacing the first start-up element with the second start-up element, and each of the first and the second start-up elements ensuring a continuous rise in current flowing in the feed line to the alternating current motor such that by; switching between the first and the second start-up elements, the current is, in turn, reduced and subsequently rises continuously.

* * * * *